United States Patent [19]

Kaimoto et al.

[11] Patent Number: 5,366,150
[45] Date of Patent: Nov. 22, 1994

[54] AUTOMOTIVE HEATING SYSTEM

[75] Inventors: Shinshi Kaimoto; Takahiro Sato; Hiroshi Hamamoto; Masanori Ishikawa, all of Hiroshima, Japan

[73] Assignee: Mazda Motor Corporation, Hiroshima, Japan

[21] Appl. No.: 153,900

[22] Filed: Nov. 17, 1993

[30] Foreign Application Priority Data

Nov. 20, 1992 [JP] Japan .................................. 4-311717

[51] Int. Cl.5 .............................................. B60H 1/02
[52] U.S. Cl. .................................. 237/2 A; 237/12.3 B
[58] Field of Search ............................ 237/2 A, 42.3 B

[56] References Cited

U.S. PATENT DOCUMENTS

| 3,498,539 | 3/1970 | Boehmfeld et al. ........ 237/12.3 B X |
| 3,521,704 | 7/1970 | Bridegum .................. 237/12.3 B X |
| 3,853,270 | 12/1974 | Prebil ........................ 237/12.3 B |
| 4,556,171 | 3/1985 | Fukami et al. . | |

FOREIGN PATENT DOCUMENTS 0340621  8/1989  European Pat. Off. .
3638471  5/1987  Germany .

OTHER PUBLICATIONS

Patent Abstracts of Japan, vol. 14, No. 347 (M-1002)(4290) 26 Jul. 1990.
Patent Abstracts of Japan, vol. 8, No. 35 (M-276)(1472) 15 Feb. 1984 & JP-A-58 191 620 (nippon jidosha) 8 Nov. 1983.
Patent Abstracts of Japan, vol. 8, No. 87 (M-291)(1524) 20 Apr. 1984 & JP-A-59 002 916 (Nippon Jidosha) 9 Jan. 1984.

*Primary Examiner*—William E. Tapolcai
*Attorney, Agent, or Firm*—Sixbey, Friedman, Leedom & Ferguson

[57] ABSTRACT

In an automotive heating system, an engine coolant circuit for circulating engine coolant through an engine of a vehicle is provided with a heat exchanger for transferring heat between the engine coolant and air, and a heat accumulator which stores heat of the engine coolant. The engine coolant circuit has a first coolant circulating path through which the engine coolant from the engine passes the heat accumulator and the heat exchanger in this order and a second coolant circulating path through which the engine coolant from the engine passes the heat exchanger and the heat accumulator in this order. The engine coolant is caused to circulate through the first coolant circulating path when the temperature of heat stored in the heat accumulator is higher than the temperature of the engine coolant while heating is required and through the second coolant circulating path when the former temperature is lower than the latter temperature while heating is required.

4 Claims, 4 Drawing Sheets

AUTOMOTIVE HEATING SYSTEM

BACKGROUND OF THE INVENTION

1. Field of the Invention

This invention relates to an automotive heating system which heats by the heat of the engine coolant, and more particularly to an automotive heating system which is provided with a heat accumulator in the engine coolant circuit.

2. Description of the Prior Art

There has been in wide use an automotive heating system in which a heat exchanger (sometimes will be referred to as "the heater core", hereinbelow) is provided in the engine coolant circuit and heat of the engine coolant heated by the engine is transferred to air through the heater core. In such a heating system, heating cannot be effected when the temperature of the engine coolant is low. That is, heating cannot be effected until the engine is started and warmed up.

Recently a heat accumulator comes to be employed in an automotive heating system in order to solve the problem that heating cannot be effected when the engine is cold. That is, the heat accumulator receives heat from the engine coolant and stores it when the temperature of the engine coolant is higher than the temperature of the heat accumulator and gives heat to the engine coolant when the temperature of the coolant is lower than the temperature of the heat accumulator. The engine coolant can be heated by the heat stored in the heat accumulator irrespective of the temperature of the engine. Thus the heat accumulator is provided between the engine and the heater core so that the engine coolant flowing out of the engine passes through the heat accumulator and the heater core in this order.

In the heating system having the heat accumulator, quick heating can be effected even when the engine is cold by heating the engine coolant by the heat accumulator. However if the engine coolant is passed through the heat accumulator when the heat accumulator is colder than the engine coolant, the coolant is robbed of heat by the heat accumulator and gets colder, whereby a longer time is required for heating.

This problem may be overcome by directly introducing the engine coolant into the heater core without passing the heat accumulator when the temperature of the heat accumulator is lower than the temperature of the engine coolant. However this approach is disadvantageous in that since the engine coolant does not pass through the heat accumulator, heat cannot be stored in the heat accumulator whereas it is desired that heat is stored in the heat accumulator as soon as possible when the heat accumulator is cold.

In Japanese Unexamined Patent Publication No. 2(1990)-120119, there is disclosed a heating system in which a first coolant circulating path for feeding the engine coolant to the heater core via a heat accumulator and a second coolant circulating path for feeding the engine coolant directly to the heater core without passing the heat accumulator are provided, and when the temperature of the heat accumulator is lower than that of the engine coolant while quick heating is required, a part of the engine coolant from the engine is caused to flow through the first coolant circulating path and the other part of the engine coolant is caused to flow through the second coolant circulating path, thereby effecting quick heating while storing heat in the heat accumulator.

However also in this heating system, the part of the engine coolant flowing through the heat accumulator flows into the heater core after being robbed of heat by the heat accumulator, which results in deterioration of the heating efficiency.

SUMMARY OF THE INVENTION

In view of the foregoing observations and description, the primary object of the present invention is to provide an automotive heating system in which quick heating can be effected by the heat stored in the heat accumulator before the engine is warmed up when the temperature of the heat accumulator is sufficiently high and heating can be efficiently effected while storing heat in the heat accumulator when the temperature of the heat accumulator is low.

In accordance with the present invention, the engine coolant circuit is provided with a heat exchanger for transferring heat between the engine coolant and air, and a heat accumulator which stores heat of the engine coolant. The engine coolant circuit has a first coolant circulating path through which the engine coolant from the engine passes the heat accumulator and the heat exchanger in this order and a second coolant circulating path through which the engine coolant from the engine passes the heat exchanger and the heat accumulator in this order. The engine coolant is caused to circulate through the first coolant circulating path when the temperature of heat stored in the heat accumulator is higher than the temperature of the engine coolant while heating is required and through the second coolant circulating path when the former temperature is lower than the latter temperature while heating is required.

The temperature of the engine coolant and the temperature of heat stored in the heat accumulator may be detected in any position so long as they can represent whether the engine coolant is heated or cooled when passing through the heat accumulator.

Whether heating is required may be detected in various ways. For example, when the heating system has a manual on/off switch, it is determined that heating is required when the switch is on. When the heating system is automatically controlled by a controller on the basis of the temperature inside the car, whether heating is required may be detected on the basis of the signal output from the controller to the heating system. In the case where the heating system is provided with a quick heating switch, it is preferred that the engine coolant be caused to circulate through the second coolant circulating path only when the temperature of heat stored in the heat accumulator is lower than the temperature of the engine coolant while quick heating is required.

When the temperature of the engine coolant is lower than a predetermined value, i.e., the engine is cold, and the temperature of heat stored in the heat accumulator is higher than the temperature of the engine coolant while heating is not required, the engine can be quickly warmed by causing the engine coolant to circulate through a third coolant circulating path where the engine coolant circulates between the engine and the heat accumulator without passing the heat exchanger.

DESCRIPTION OF THE PREFERRED EMBODIMENT

Figure 1:
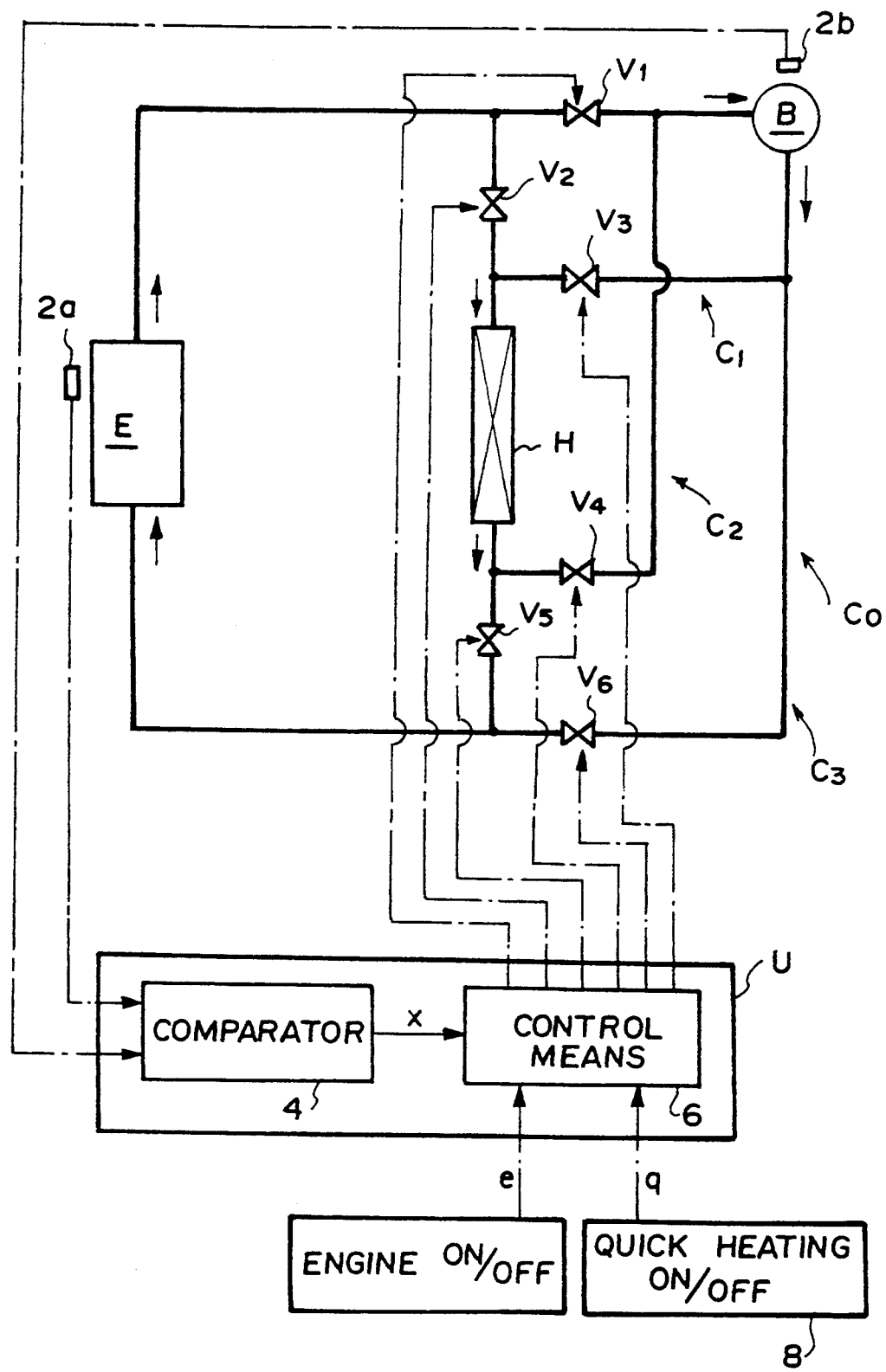
FIG. 1 is a schematic view showing a heating system in accordance with an embodiment of the present invention.

In FIG. 1, an engine coolant circuit Co for circulating coolant through an engine E is provided with a heat accumulator B which stores heat of the coolant heated by the engine E, and a heat exchanger (heater core) H which transfers heat between the coolant and air. The engine E is provided with a temperature sensor $2a$ which detects the temperature $T_E$ of coolant in the water jacket of the engine E and the heat accumulator B is provided with a temperature sensor $2b$ which detects the temperature $T_B$ of the heat stored in the heat accumulator B. The detecting signals of the temperature sensors $2a$ and $2b$ are input into a comparator 4 in a control unit U.

The engine coolant circuit Co has a plurality of branch passages and six switching valves $V_1$ to $V_6$ for switching the circulating paths of the engine coolant. The switching valves $V_1$ to $V_6$ are opened and closed by control signals output from a control means 6 in the control unit U as will be described later.

The relation between the circulating paths ($C_1$ to $C_3$) and opening and closure of the switching valves $V_1$ to $V_6$ is as shown in the following table.

| path | valve | | | | | |
|------|-------|-------|-------|-------|-------|-------|
|      | $V_1$ | $V_2$ | $V_3$ | $V_4$ | $V_5$ | $V_6$ |
| $C_1$ | O | X | O | X | O | X |
| $C_2$ | X | O | X | O | X | O |
| $C_3$ | O | X | X | X | X | O |

O ... open
X ... closed

As can be seen from the table above, in this embodiment, the engine coolant circulates through one of the first to third circulating paths $C_1$ to $C_3$. When the valves $V_1$, $V_3$ and $V_5$ are opened with the valves $V_2$, $V_4$ and $V_6$ closed, the engine coolant circulates through the first circulating path $C_1$ passing the engine E, the heat accumulator B and the heater core H in this order. When the valves $V_2$, $V_4$ and $V_6$ are opened with the valves $V_1$, $V_3$ and $V_5$ closed, the engine coolant circulates through the second circulating path $C_2$ passing the engine E, the heater core H and the heat accumulator B in this order. When the valves $V_1$ and $V_6$ are opened with the valves $V_2$, $V_3$, $V_4$ and $V_5$ closed, the engine coolant circulates through the third circulating path $C_3$ passing the engine E and the heat accumulator B without passing the heater core H.

The control means 6 in the control unit U selects one of the circulating paths $C_1$ to $C_3$ on the basis of an engine on/off signal e, a quick-heating requiring signal q and a comparison signal x which is output from the comparator 4. The comparison signal x represents the result of comparison of the temperature $T_E$ of coolant in the water jacket of the engine E detected by the temperature sensor $2a$ and the temperature $T_B$ of the heat stored in the heat accumulator B detected by the temperature sensor $2b$. The engine on/off signal e may be any signal so long as it represents whether the engine E is running.

The quick-heating requiring signal q is generated when a quick heating button 8, which is on an instrument panel in the cabin, is depressed by a passenger. Though, in this embodiment, the quick heating button 8 is provided separately from a switch for operating the heating system, it may double as the switch for operating the heating system. Further the heating system may be arranged so that the quick-heating requiring signal q is automatically generated when the system determines that quick heating should be effected on the basis of the temperature in the cabin or the like.

Figure 2:
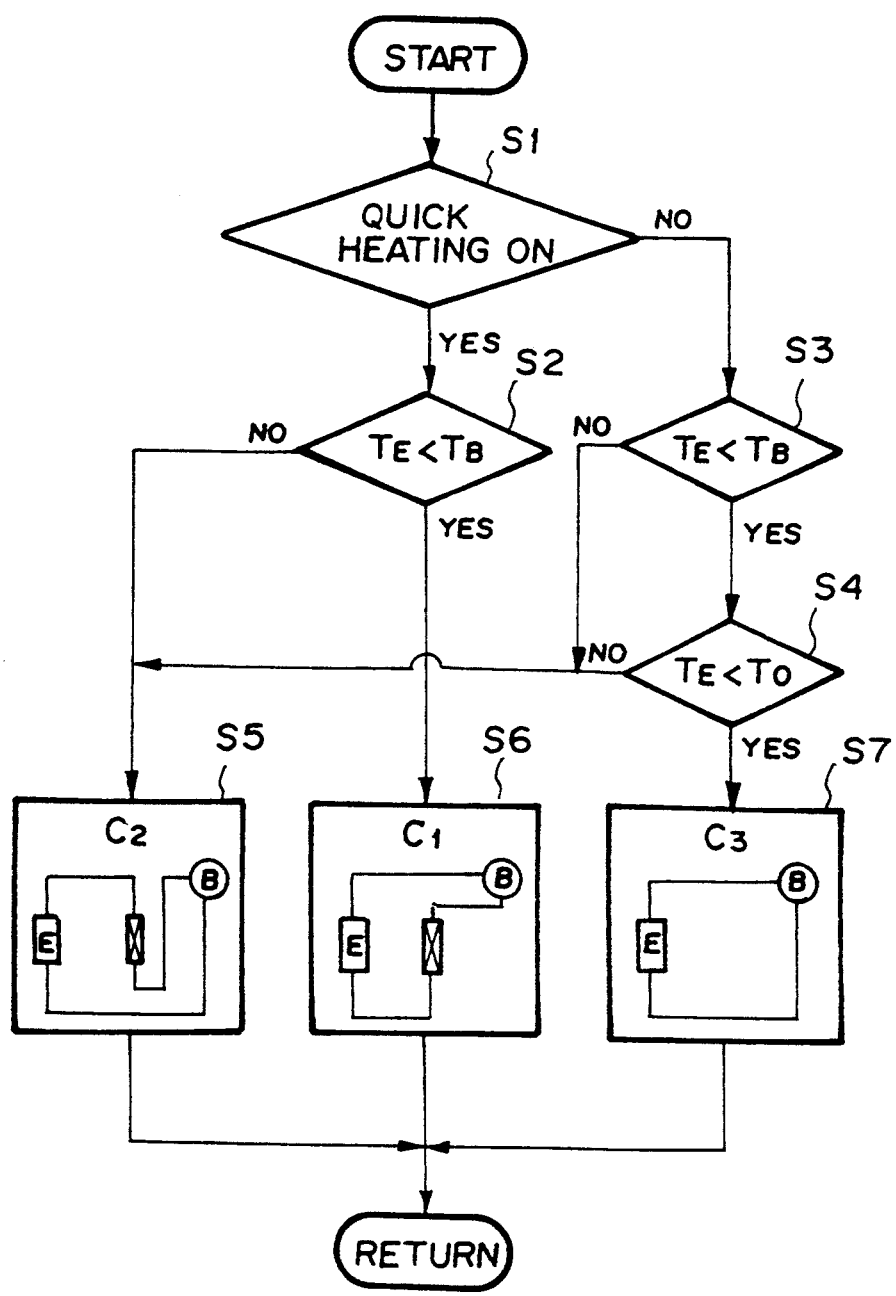
FIG. 2 is a flow chart for illustrating control of the heating system.

FIG. 2 shows a flow chart for illustrating the operation of the control means 6 in controlling the heating system of this embodiment in the state where it is determined that the engine E is running on the basis of the engine on/off signal e. The control means 6 first determines whether the quick heating button 8 has been depressed on the basis of whether the quick-heating requiring signal q has been generated. (step S1) When it is determined that the quick heating button 8 has been depressed, the control means 6 determines whether the temperature $T_B$ of the heat stored in the heat accumulator B is higher than the temperature $T_E$ of coolant in the water jacket of the engine E on the basis of the comparison signal x from the comparator 4. (step S2) When it is determined that the former is higher than the latter, the control means 6 opens the valves $V_1$, $V_3$ and $V_5$ and closes the valves $V_2$, $V_4$ and $V_6$ so that the engine coolant circulates through the first circulating path $C_1$. (step S6)

That the temperature $T_B$ of the heat stored in the heat accumulator B is higher than the temperature $T_E$ of coolant in the water jacket of the engine E means that the coolant flowing out of the engine E can be heated by the heat accumulator B, and accordingly, quick heating can be efficiently effected by passing through the heater core H after passing through the heat accumulator B. The engine coolant is circulated by a water pump driven by the engine not shown.

When it is determined in step S2 that the temperature $T_B$ of the heat stored in the heat accumulator B is not higher than the temperature $T_E$ of coolant in the water jacket of the engine E, the control means 6 closes the valves $V_1$, $V_3$ and $V_5$ and opens the valves $V_2$, $V_4$ and $V_6$ so that the engine coolant circulates through the second circulating path $C_2$. (step S5)

That the temperature $T_B$ of the heat stored in the heat accumulator B is not higher than the temperature $T_E$ of coolant in the water jacket means that the temperature of the coolant as flowing out the engine E is lowered when the coolant is passed through the heat accumulator B. Accordingly in this case, the coolant flowing out the engine E is directly passed to the heater core H before passed through the heat accumulator B. Further the coolant is passed through the heat accumulator B after passing through the heater core H and the heat of the coolant is stored in the heat accumulator B.

When it is determined in step S1 that the quick heating button 8 has not been depressed, the control means 6 determines in step S3 whether the temperature $T_B$ of the heat stored in the heat accumulator B is higher than the temperature $T_E$ of coolant in the water jacket of the engine E on the basis of the comparison signal x from the comparator 4. When it is determined that the former is not higher than the latter, the control means 6 closes the valves $V_1$, $V_3$ and $V_5$ and opens the valves $V_2$, $V_4$ and $V_6$ so that the engine coolant circulates through the second circulating path $C_2$. (step S5) Even if the engine coolant circulates through the second circulating path $C_2$, heating is not effected until the switch for operating the heating system is turned on. When it is determined in step S3 that the temperature $T_B$ of the heat stored in the heat accumulator B is higher than the temperature $T_E$ of coolant in the water jacket, the control means 6 determines in step S4 whether the temperature $T_E$ of coolant in the water jacket is lower than a predetermined temperature To. When it is determined the former is not lower than the latter, the the control means 6 closes the valves $V_1$, $V_3$ and $V_5$ and opens the valves $V_2$, $V_4$ and $V_6$ so that the engine coolant circulates through the second circulating path $C_2$. (step S5) Otherwise the control means 6 opens the valves $V_1$ and $V_6$ and closes the valves $V_2$ to $V_5$ so that the engine coolant circulates through the third circulating path $C_3$. (step S7)

The predetermined temperature To is a reference temperature for determining whether the engine is completely cold and is determined according to various factors. Accordingly when the temperature $T_E$ of coolant in the water jacket is lower than the predetermined temperature To and at the same time the quick heating is not required, the engine E can be efficiently warmed up by circulating the coolant through the third circulating path $C_3$.

Figure 3:
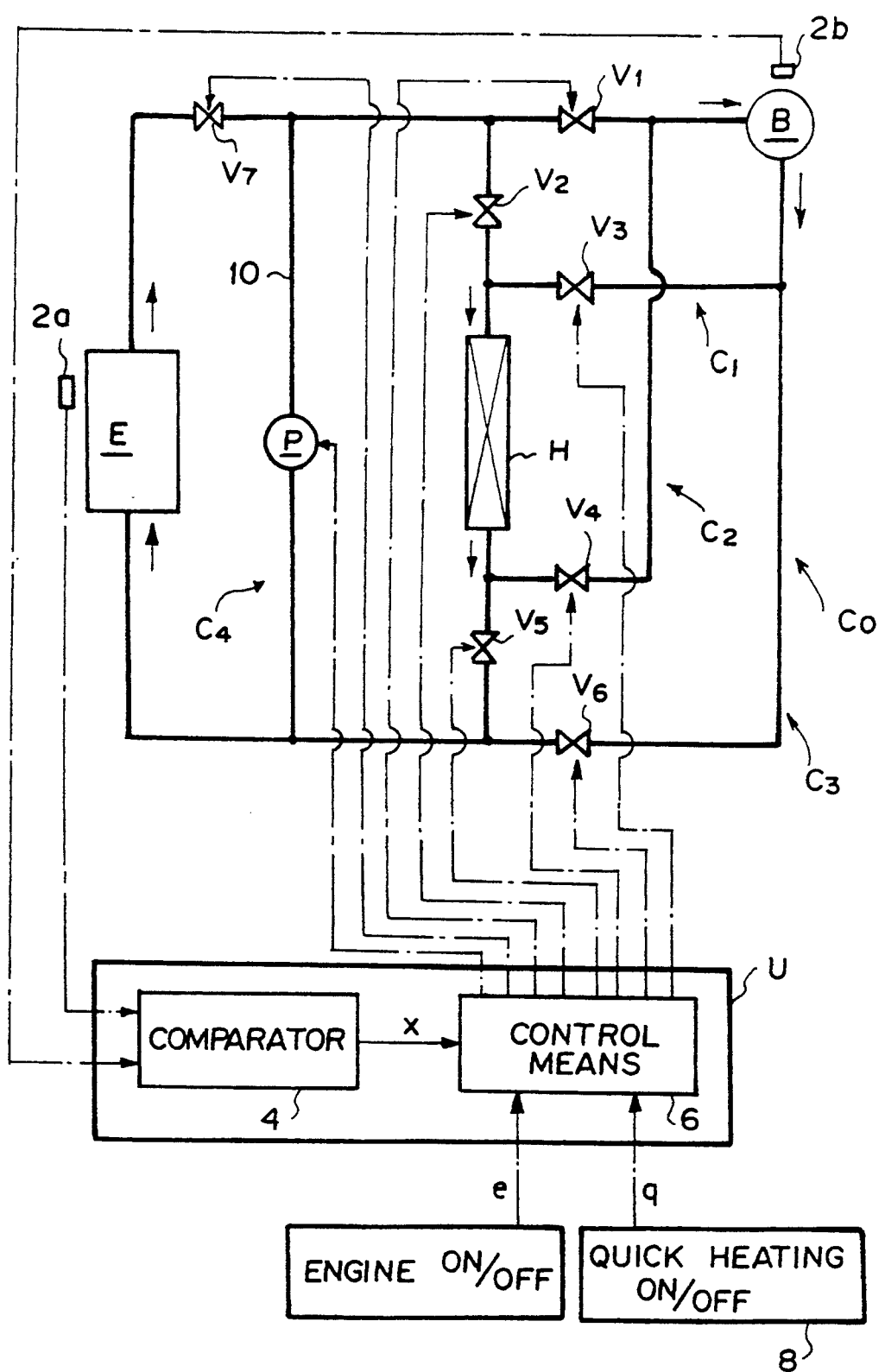
FIG. 3 is a schematic view showing a heating system in accordance with another embodiment of the present invention.

FIG. 3 is a schematic view showing an automotive heating system in accordance with a second embodiment of the present invention. In FIG. 3, the elements analogous to those shown in FIG. 1 are given the same reference numerals and will not be described in detail here.

The heating system of this embodiment differs from that of the first embodiment in the following points. That is, in the first embodiment, the engine coolant is circulated by the water pump which is driven by the engine E and accordingly, the coolant cannot be circulated when the engine is not running. In this embodiment, the engine coolant circuit Co is provided with a bypass passage 10 which bypasses the engine E and an electric water pump P which is caused to operate by a control signal from the control means 6 is provided in the bypass passage 10 so that the coolant can be circulated even if the engine E is not running. Further a seventh valve V7 is provided in the engine coolant circuit Co upstream of the bypass passage 10.

The relation between the circulating paths ($C_1$, $C_2$ and $C_4$), opening and closure of the switching valves $V_1$ to $V_7$ and on and off of the water pump P is as shown in the following table.

| path | $V_1$ | $V_2$ | $V_3$ | $V_4$ | $V_5$ | $V_6$ | $V_7$ | P |
|---|---|---|---|---|---|---|---|---|
| $C_1$ | O | X | O | X | O | X | O | OFF |
| $C_2$ | X | O | X | O | X | O | O | OFF |
| $C_4$ | O | X | O | X | O | X | X | ON |

O ... open
X ... closed

As can be seen from the table above, in this embodiment, the engine coolant circulates through one of first, second and fourth circulating paths $C_1$, $C_2$ and $C_4$. When the valves $V_1$, $V_3$, $V_5$ and $V_7$ are opened and the valves $V_2$, $V_4$ and $V_6$ are closed with the engine E running, the engine coolant circulates through the first circulating path $C_1$ passing the engine E, the heat accumulator B and the heater core H in this order with the water pump P being off. When the valves $V_2$, $V_4$, $V_6$ and $V_7$ are opened and the valves $V_1$, $V_3$ and $V_5$ are closed with the engine E running, the engine coolant circulates through the second circulating path $C_2$ passing the engine E, the heater core H and the heat accumulator B in this order with the water pump P being off. When the valves $V_1$, $V_3$ and $V_5$ are opened and the valves $V_2$, $V_4$, $V_6$ and $V_7$ are closed with the water pump P turned on, the engine coolant circulates through the fourth circulating path $C_4$ passing the water pump P, the heat accumulator B and the heater core H without passing through the engine E.

The control means 6 in the control unit U selects one of the circulating paths $C_1$, $C_2$ and $C_4$ on the basis of the engine on/off signal e, the quick-heating requiring signal q and the comparison signal x.

Figure 4:
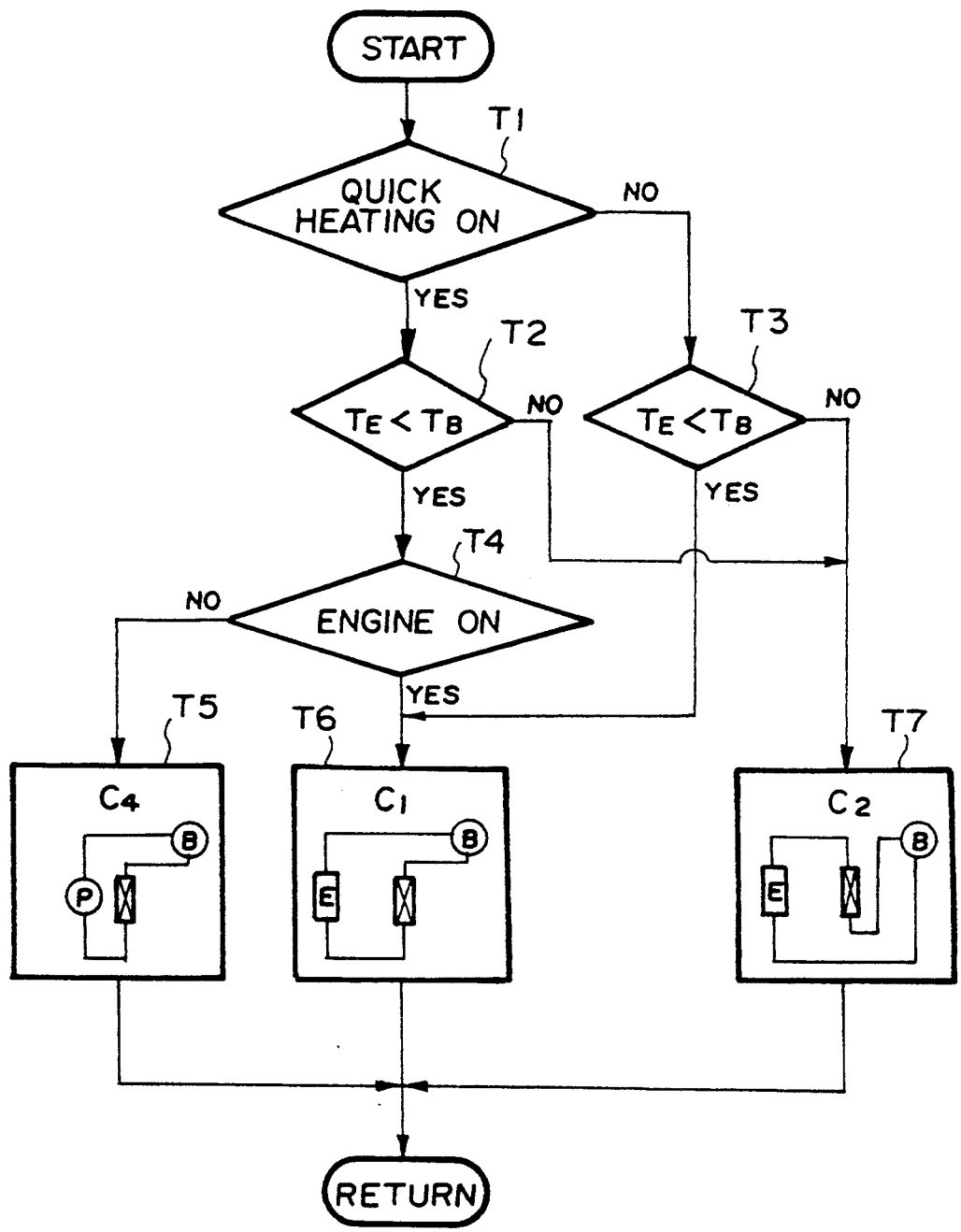
FIG. 4 is a flow chart for illustrating control of the heating system.

FIG. 4 shows a flow chart for illustrating the operation of the control means 6 in controlling the heating system of this embodiment. The control means 6 first determines whether the quick heating button 8 has been depressed on the basis of whether the quick-heating requiring signal q has been generated. (step T1) When it is determined that the quick heating button 8 has been depressed, the control means 6 determines whether the temperature $T_B$ of the heat stored in the heat accumulator B is higher than the temperature $T_E$ of coolant in the water jacket of the engine E on the basis of the comparison signal x from the comparator 4. (step T2) When it is determined that the former is higher than the latter, the control means 6 determines in step T4 whether the engine E is running on the basis of the engine on/off signal e. When it is determined that the engine E is running, the control means 6 opens the valves $V_1$, $V_3$, $V_5$ and $V_7$ and closes the valves $V_2$, $V_4$ and $V_6$ so that the engine coolant circulates through the first circulating path $C_1$. (step T6)

That the temperature $T_B$ of the heat stored in the heat accumulator B is higher than the temperature $T_E$ of coolant in the water jacket of the engine E means that the coolant flowing out of the engine E can be heated by the heat accumulator B, and accordingly, quick heating can be efficiently effected by passing through the heater core H after passing through the heat accumulator B.

When it is determined in step T4 that the engine E is not running, the control means 6 opens the valves $V_1$, $V_3$ and $V_5$ and closes the valves $V_2$, $V_4$, $V_6$ and $V_7$ while turning on the water pump so that the engine coolant circulates through the fourth circulating path $C_4$ passing the water pump P, the heat accumulator B and the heater core H without passing through the engine E, whereby quick heating can be effected even when the engine E is not running. (step T5)

Even when the quick heating button 8 has been depressed, the control means 6 opens the valves $V_2$, $V_4$, $V_6$ and $V_7$ and closes the valves $V_1$, $V_3$ and $V_5$ when the temperature $T_B$ of the heat stored in the heat accumulator B is not higher than the temperature $T_E$ of coolant in the water jacket. (step T7) Since the control means 6 selects the second circulating path $C_2$ in step T7 irrespective of whether the engine E is running, the coolant circulates through the second circulating path $C_2$ only when the engine is running in this case.

That the temperature $T_B$ of the heat stored in the heat accumulator B is not higher than the temperature $T_E$ of coolant in the water jacket means that the temperature of the coolant as flowing out the engine E is lowered when the coolant is passed through the heat accumulator B. Accordingly in this case, the coolant flowing out the engine E is directly passed to the heater core H before passed through the heat accumulator B. Further the coolant is passed through the heat accumulator B after passing through the heater core H and the heat of the coolant is stored in the heat accumulator B.

When it is determined in step T1 that the quick heating button 8 has not been depressed, the control means 6 determines in step T3 whether the temperature $T_B$ of the heat stored in the heat accumulator B is higher than the temperature $T_E$ of coolant in the water jacket of the engine E. When it is determined that the former is not higher than the latter, the control means 6 closes the valves $V_1$, $V_3$ and $V_5$ and opens the valves $V_2$, $V_4$ and $V_6$ (that is, the second circulating path $C_2$ is selected). (step T7) Otherwise the control means 6 selects the first circulating path $C_2$ in step T6. Though first or second circulating path where the coolant circulates through the heater core H is selected even when the quick heating button 8 has not been depressed, heating is not effected until the switch for operating the heating system is turned on.

What is claimed is;

1. An automotive heating system comprising
   an engine coolant circuit for circulating engine coolant through an engine of a vehicle, a heat exchanger for transferring heat between the engine coolant and air, and a heat accumulator which stores heat of the engine coolant, the engine coolant circuit having a first coolant circulating path through which the engine coolant from the engine passes the heat accumulator and the heat exchanger in this order and a second coolant circulating path through which the engine coolant from the engine passes the heat exchanger and the heat accumulator in this order,
   a path switching means which selectively opens one of the first and second coolant circulating paths,
   a temperature detecting means which detects whether the temperature of heat stored in the heat accumulator is higher than the temperature of the engine coolant,
   a heating requirement detecting means which detects whether heating is required, and
   a control means which controls the path switching means on the basis of whether the temperature of heat stored in the heat accumulator is higher than the temperature of the engine coolant and whether heating is required, the control means controlling the path switching means so that the engine coolant circulates through the first coolant circulating path when the temperature of heat stored in the heat accumulator is higher than the temperature of the engine coolant while heating is required and through the second coolant circulating path when the former temperature is lower than the latter temperature while heating is required.

2. An automotive heating system as defined in claim 1 in which a quick heating requirement detecting means which detects whether quick heating is required is provided and said control means controls the path switching means so that the engine coolant circulates through the first coolant circulating path when the temperature of heat stored in the heat accumulator is higher than the temperature of the engine coolant while quick heating is required and through the second coolant circulating path when the temperature of heat stored in the heat accumulator is lower than the temperature of the engine coolant while quick heating is required.

3. An automotive heating system as defined in claim 1 in which said engine coolant circuit is further provided with a third coolant circulating path through which the engine coolant circulates between the engine and the heat accumulator without passing the heat exchanger, and said control means controls the path switching means so that the engine coolant circulates through the third coolant circulating path when the temperature of heat stored in the heat accumulator is higher than the temperature of the engine coolant and the latter temperature is lower than a predetermined value while heating is not required.

4. An automotive heating system as defined in claim 1 in which said engine coolant circuit is further provided with a third coolant circulating path through which the engine coolant circulates between the heat exchanger and the heat accumulator without passing the engine and an electric water pump which drives the engine coolant while the engine stops, and said control means controls the path switching means and the water pump so that the engine coolant circulates through the third coolant circulating path when the temperature of heat stored in the heat accumulator is higher than the temperature of the engine coolant while heating is required and the engine stops.

* * * * *

UNITED STATES PATENT AND TRADEMARK OFFICE
CERTIFICATE OF CORRECTION

PATENT NO. : 5,366,150
DATED : November 22, 1994
INVENTOR(S) : Shinshi Kajimoto, Takahiro Sato; Hiroshi Hamamoto; Masanori Ishikawa It is certified that error appears in the above-identified patent and that said Letters Patent is hereby corrected as shown below:

On title page, item

[75] Inventors: Shinshi Kajimoto; Takahiro Sato; Hiroshi Hamamoto; Masanori Ishikawa, all of Hiroshima, Japan Signed and Sealed this Twenty-fifth Day of April, 1995

Attest:

BRUCE LEHMAN

*Attesting Officer*     *Commissioner of Patents and Trademarks*